United States Patent

Obata et al.

[11] Patent Number: 5,574,637
[45] Date of Patent: Nov. 12, 1996

[54] CONTROL APPARATUS FOR AN AUTOMATED PRODUCTION SYSTEM WORKCELL

[76] Inventors: Masatoshi Obata, 4-11-4, Minamirinkan; Chihiro Sawada, 2-18-4-104, Eda-minami; Masayuki Takata, 450-61, Ohzenji; Nobuyoshi Terawaki, 1-14-4, Ryohsei, all of Kanagawa-ken, Japan

[21] Appl. No.: 220,710

[22] Filed: Mar. 31, 1994

[30] Foreign Application Priority Data

Apr. 8, 1993 [JP] Japan ................................. 5-081793

[51] Int. Cl.$^6$ .......................... G06F 19/00; G05B 19/414
[52] U.S. Cl. .................. 364/131; 318/568.2; 364/474.11; 395/82
[58] Field of Search ............................. 364/468, 474.11, 364/131–136, 191–193; 318/568.2; 395/82, 84, 81; 901/6–8

[56] References Cited

U.S. PATENT DOCUMENTS

| | | | |
|---|---|---|---|
| 4,727,494 | 2/1988 | Buote | 395/82 |
| 4,730,258 | 3/1988 | Takeda et al. | 395/82 X |
| 4,833,624 | 5/1989 | Kuwahara et al. | 395/84 |
| 4,835,730 | 5/1989 | Shimano et al. | 395/82 X |
| 4,896,087 | 1/1990 | Onaga et al. | 395/82 X |
| 4,998,206 | 3/1991 | Jones et al. | 364/468 |

Primary Examiner—Joseph Ruggiero

[57] ABSTRACT

A robot, DI/DO devices, and an operation panel in an automated production system workcell are controlled by a single workcell controller 17. Workcell operation software 31, a workcell operation language processor 32 and a workcell control driver 33 for realtime control run on the controller 17. The workcell operation language processor 32 interprets the workcell operation software 31 and provides commands to the workcell control driver 33. Smooth installation of a workcell, easy maintenance of a workcell, and flexible programming of operation software for a workcell are thus enabled.

13 Claims, 11 Drawing Sheets

```
ROBOT MOVE(P1);         —— move robot to P1

ROBOT WAIT(P1);         —— confirm arrival of robot at P1

DOon(A1);               —— inform the PLC of completion of the robot operation by setting
                           a DO signal A1

WHILE DI(B1)=OFF do ——  confirm completion of device 1 operation by a DI signal B1

;

ROBOT MOVE(P2);         —— move robot to P2

ROBOT WAIT(P2);         —— confirm arrival of robot at P2

DO on(A2);              —— inform the PLC of completion of the robot operation by setting
                           a DO signal A2

WHILE DI(B2)=OFFdo ——   confirm completion of device 2 operation by a DI signal B2

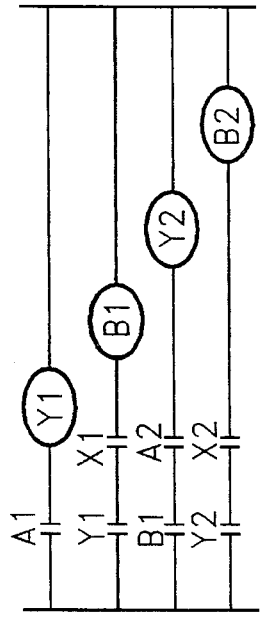

FIG.3

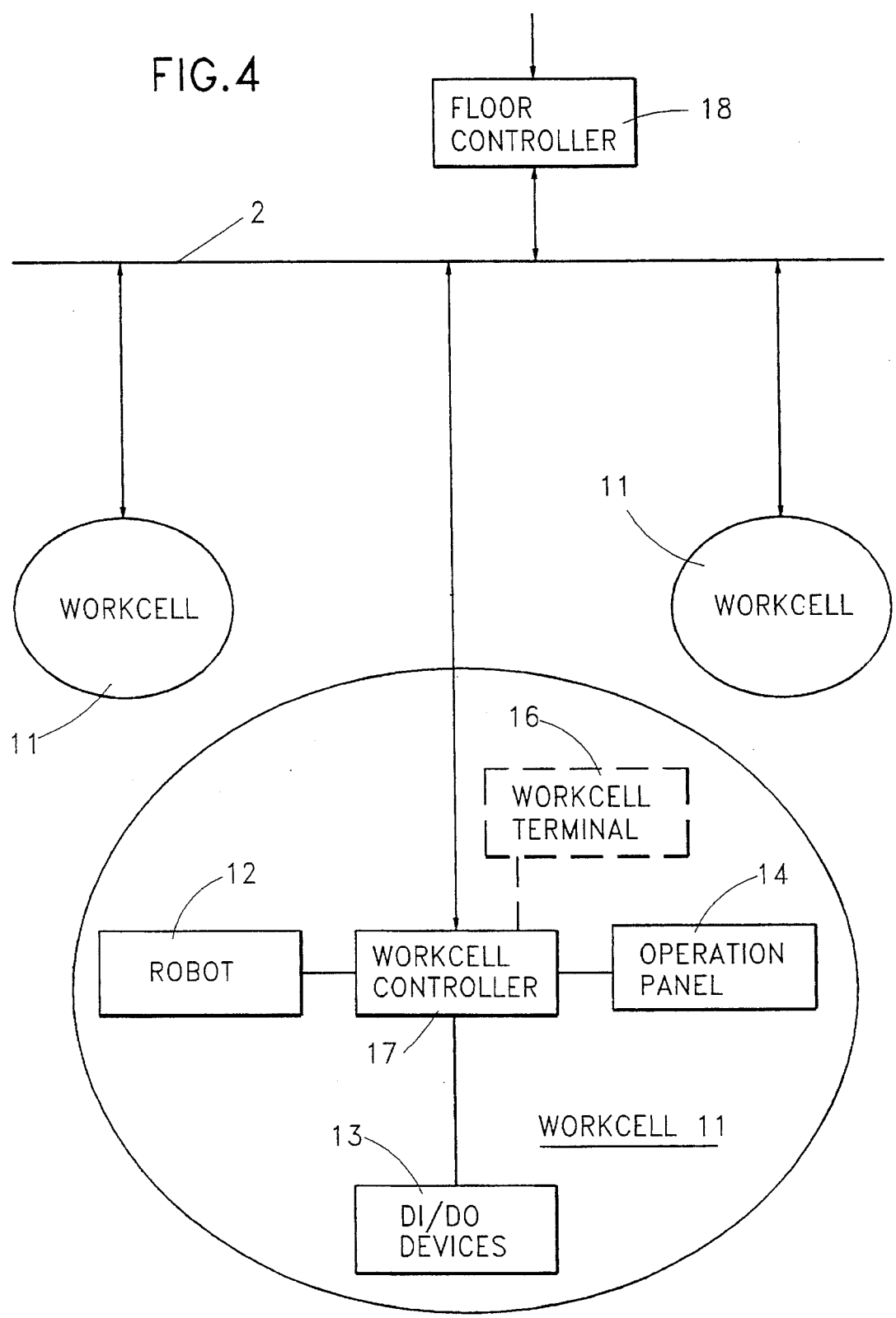

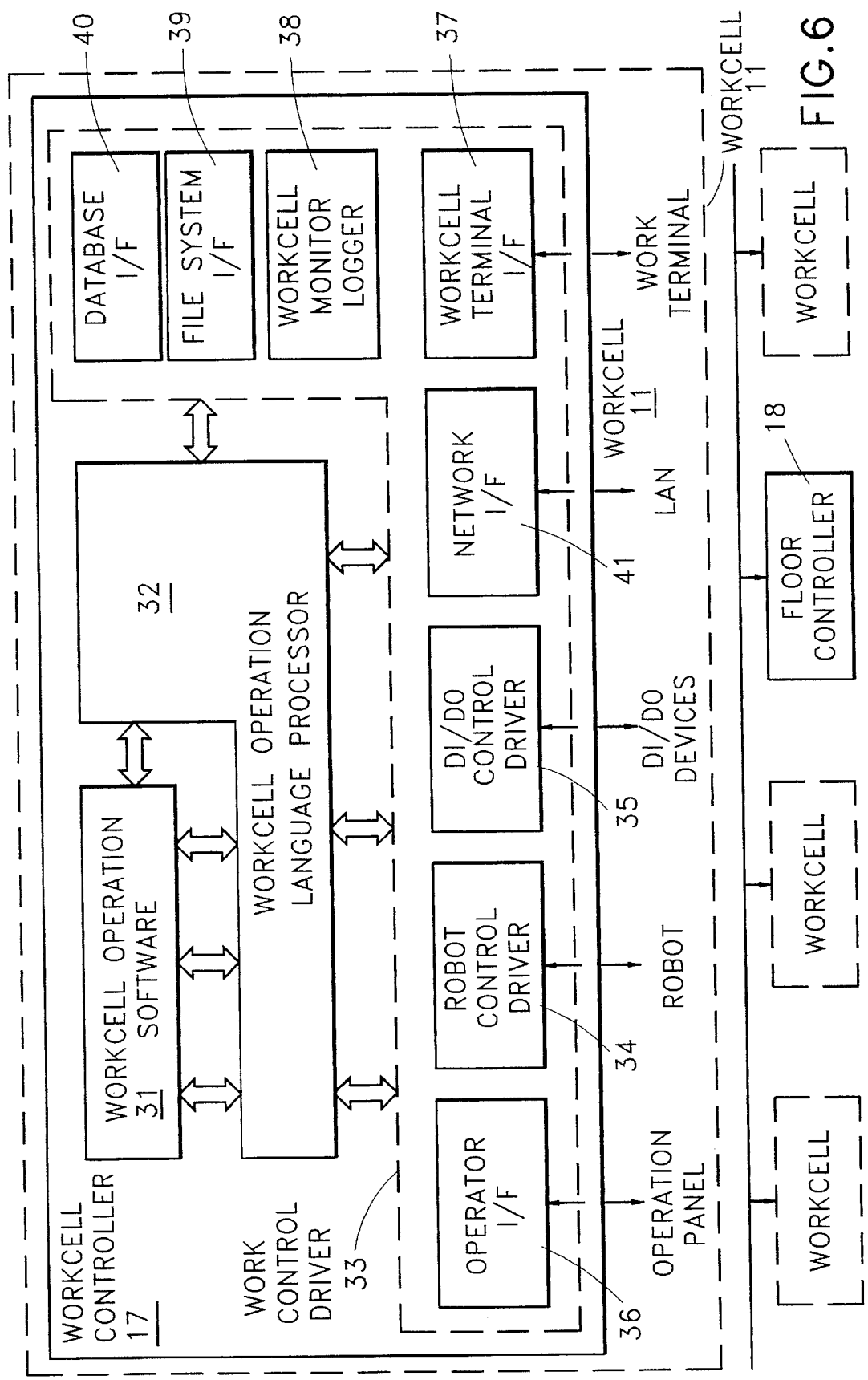

FIG. 7

```
ROBOTMOVE(P1);    MOVE THE ROBOT TO P1.
ROBOTWAIT(P1);    CONFIRM ARRIVAL OF THE ROBOT AT P1.
DOon(Y1);         OPERATION OF DEVICE 1 BY SETTING DO SIGNAL Y1.
DIWAITOn(X1)      CONFIRM COMPLETION OF DEVICE 1 OPERATION BY A DI SIGNAL X1.
ROBOTMOVE(P2);    MOVE THE ROBOT TO P2.
ROBOTWAIT(P2);    CONFIRM ARRIVAL OF THE ROBOT AT P2
DOon(Y2);         OPERATION OF DEVICE 2 BY SETTING DO SIGNAL Y2.
DIWAITOn(X2);     CONFIRM COMPLETION OF DEVICE 2 OPERATION BY A DI SIGNAL X2.
```

FIG. 9

```
task Initialize()
  begin
  RegisterCondAct(PARTS_ROTATION,SIGNAL,RAISE,      Activation of the function PartsRotation()as
  PartsRotation,TASK_SPAWN);                        a task when the PARTS_ROTATION signal is turned on
  ...
  end;

function PartsRotation()
  begin
  if DIwaitOff(DI PARYS FULL,30000)=TIMEOUT then    confirmation of the product
                                                   error processing of the product stack
  ...
  DOon(DO_ROT_ACTUATOR);                            inversion of the product if DIwaitOn(DI_ROT_SENSOR,3000)=TIMEOUT then     confirmation of the inversion
                                                   error processing of the product inversion
  ...
  if DIwaitOn(DI PARTS FULL,1000)=TIMEOUT then     confirmation of the product
                                                   error processing of the product inversion
  ...
  end:
```

FIG.10

```
task PartsRotation()
  begin
    while TRUE do begin
      while PartsRotationCommand=FALSE do
        ;
      time0=Time();
      while Time()-time0 <3000 do       ⎫
        if DI(DI_PARTS_FULL)=ON then    ⎬ confirmation of the product
          break;                        ⎭
      if DI(DI_PARTS_FULL)=ON then      } error processing of the product stack
        ...
      DOon(DO_ROT_ACTUATOR);            } Inversion of the product
      time0=Time();
      while Time()-time0 <3000 do       ⎫
        if DI(DI_ROT_SENSOR)=ON then    ⎬ confirmation of the inversion
          break;                        ⎭
      if DI(DI_ROT_SENSOR)=OFF then     } error processing of the
        ...                               product inversion
      time0=Time();
      while Time()-time0 <1000 do       ⎫
        ifDI(DI_PARTS_FULL)=ON them     ⎬ confirmation of the product
          break                         ⎭
      if DI(DI_PARTS_FULL)=OFF then     } error processing of the
        ...                               product inversion
    end;
end;
```

```
            KEY DEFINITIONS
   a: STOPPER UP      b: STOPPER DOWN
   c: HAND OPEN       d: HAND CLOSED

1: COUNTER RESET
         2: COUNTER SAVE
         3: COUNTER LOAD
                :
```

0:CHAR  |      MANUAL MODE OPERATION        |
0:ATTR  |   2                            0  |
1:CHAR  |   STATUS :         ROBOT :        |
1:ATTR  |   1       0        1       0      |
2:CHAR  |   ERROR :          CONVEYOR :     |
2:ATTR  |   1       0        1       0      |
  :                      :
```

FIG.14

| TYPE | NAME | LOCA-TION | ATTRI-BUTE | FORMAT |
|---|---|---|---|---|
| STRING | STATUS | (1,9) | 3 | [%s] |
| STRING | STATUS | (1,9) | 3 | [%s] |
| INT | ERROR | (2,9) | 3 | [%08x] |
| STRING | ROBOT | (1,32) | 2 | [%s] |
| STRING | CONV | (2,32) | 2 | [%s] |
| . | . | . | . | . |
| . | . | . | . | . |
| . | . | . | . | . |

FIG.15

CONTROL APPARATUS FOR AN AUTOMATED PRODUCTION SYSTEM WORKCELL

FIELD OF THE INVENTION

The present invention relates to an automated production system or factory automation (FA) system and a workcell included therein, and more specifically, to a control apparatus for device control and information handling for the workcell.

BACKGROUND OF THE INVENTION

A conventional factory automation (FA) system is shown schematically in FIG. 1. A plurality of workcells 1 of the FA system are connected to each other and to an upper controller (FA PC) 3 via a communication network 2. The following device control and information handling tasks are performed in the workcell 1:

Control of an industrial robot 4 and DI/DO devices 5

Control of an operation panel 6 that is an interface device for an operator

Collection, analysis, and storage of such information as workcell operation status, and communication with the other workcells 1 and the upper controller 3.

The above device control and information handling tasks are performed by the following devices:

I. A robot controller 7, for the control of the industrial robot 4

II. A programmable logic controller (PLC) 8, for the sequence control of the DI/DO devices 5

The PLC 8 performs the following operations:

Receiving, as DI signals, the statuses of the sensors provided in the devices

Determining output signals according to registered conditions

Controlling the actuators, valves, and relays provided in the devices by outputting DO signals The DI/DO (digital-in/digital out) signals are digital signals that take two states: on and off.

III. FA personal computer 9

This device performs the following operations:

Controlling the operation panel 6 (namely, the display or handy terminal) provided for the interface with an operator Collecting, analyzing, and storing various items of information Communicating with the other workcells 1 and the upper controller 3

As shown in FIG. 1, the conventional workcell 1 has a plurality of control devices for device control and information handling. Therefore, the operation software inherent in the workcell 1 needs to be separated into a program written in a robot language that runs on the robot controller 7, a ladder chart that runs on the PLC 8, and a program written in an ordinary high-level programming language such as C language that runs on the FA personal computer 9. Consequently, the programs for many control devices used in one workcell 1 must be prepared independently. Further, the programming must be conducted so as to ensure that the robot 4 and the DI/DO devices 5 operate, when viewed as a whole, at high speed, in synchronization with one another and in asynchronization with one another.

FIGS. 2 and 3 show synchronized programs describing operations of the robot 4 and devices 1 and 2 according to prior art. A robot language program (FIG. 2) and a ladder chart (FIG. 3) need to be prepared for the robot controller 7 and the PLC 8, respectively.

SUMMARY OF THE INVENTION

With the shortening of the product development cycle, conventional simple production systems are no longer sufficient. There is a need for more flexible production systems that can accommodate mixed production of a plurality of models or even be diverted easily to production of other products. In such an environment, the following items are desirable:

Smooth introduction of workcells

Easy maintenance of workcells

Flexible programming of operation software for workcells

Free transfer of operational information and operation statuses

Compact and inexpensive control systems

However, the conventional control device constitution for a workcell does not necessarily satisfy the above requirements. First, since there exist physically at least three control devices (robot controller 7, PLC 8, and FA PC 9) for device control and information handling, the connections between those control devices become complex, which makes it difficult to introduce and maintain workcells and to realize a compact and inexpensive control system. Second, the operation software for a workcell needs to be written in different languages for the robot controller 7, PLC 8 and FA PC 9. In general, it is difficult for a programmer to become sufficiently skilled in different languages to attain overall synchronization between the operations of the DI/DO devices 5 and the robot 4 by using a plurality of programs written separately. This in turn makes it difficult to introduce and maintain workcells and to reduce the cost of the control system. It also makes it difficult to provide flexible operation software for workcells.

In particular, ladder charts, as shown in FIG. 3, are conventionally used as programming tools to describe the conditions for a PLC 8. Although a ladder chart is effective to some extent for performing very simple device control, programs produced by using ladder charts for DI/DO signal processing of general workcell devices are complex ones of several hundred pages. It frequently occurs that after a certain period, even the programmer who wrote the program does not remember how the program works. In improving or maintaining a workcell after a certain period after its installation, since the details of its operation are unclear, even simple improvement or maintenance will take much more time than expected. Furthermore, it is very difficult to understand ladder charts written by another person.

Recently, a system called specificational function coding (SFC) was proposed. This system describes the general flow of control and detailed device control separately by dividing ladder charts into blocks to some extent. However, since the system still relies on ladder charts, it is not considered to be particularly effective.

Another attempt has already been made to perform DI/DO signal processing by using a high-level language. However, since conventional program interfaces simply allow recognition of the statuses of DI signals and the output of DO signals, the use of a high-level language does not allow effective programming.

Published Unexamined Patent Application No. 61-110204 discloses a control method for automatic devices in which, in a workcell having a plurality of interconnected automatic devices such as a robot controller, a PLC, and an image processor, a program written in a unified language is input through a programming console and then divided and sent to those devices. The automatic devices perform their control operations cooperatively while communicating with each other. However, since this method is based on the premise that each workcell has a plurality of control devices such as a robot controller and a PLC, it cannot solve the above-described problems in the hardware of the conventional workcell. Further, although programs for the robot controller and the PLC can be written in a unified language, programming is still performed separately for the robot controller and the PLC. Therefore, it cannot be said that this publication proposes an effective method for producing programs with control operations for a plurality of automatic devices mixed together.

Returning to FIG. 1, in the conventional workcell 1, the information acquired by the robot controller 7, for instance, cannot be transferred to another workcell 1 without passing through the PLC 8. Therefore, it is difficult to transfer a large quantity of information at a high rate.

In terms of flexible programming of workcell operation software, the control of the operation panel 6 has some problems.

As shown in FIG. 1, the operation panel 6 is provided in the workcell 1 for debugging at the time of software introduction, maintenance, and monitoring installation. The operation panel 6 mainly consists of input devices and output devices. The input devices are generally classified into the following two types:

Hardware-dependent input devices that are directly (on the signal level) connected to the devices in the workcell 1

Programmable input devices that produce action outputs via software in response to inputs received from a general-purpose terminal board such as a hand-held terminal.

Recently, input devices of the latter type have generally been used because, even if the workcell 1 is redesigned, it can be modified and reused. In many workcells 1, such an input device is provided in the PLC 8 and is made programmable by means of the ladder charts of the PLC 8. However, the program needs to be altered to change inputs and corresponding action outputs, and the alteration of ladder charts requires a great deal of labor. That is, although this type of input device can be used, as a device, for general purposes, its software is not available for general purposes.

The output devices used, such as a liquid crystal display, do not occupy a large space and can be operated easily. They are used mainly in such a way that several screens are registered in advance and a screen to be displayed is designated at the appropriate time. In order to display a screen that dynamically varies, it is necessary to prepare a special program for such a case. Therefore, software for this type of output device is not available for general purposes.

The present invention seeks to provide a solution to the above problems in the art, and thus to satisfy the requirements for smooth installation of a workcell, its easy maintenance, flexible programming of operation software for a workcell and a compact and inexpensive control system.

Accordingly, the present invention provides in a first aspect, control apparatus for controlling the operation of a robot and a digital input/output (DI/DO) device in a workcell of an automated production system, the control apparatus being characterised in that it includes workcell operation control means responsive to control commands generated in the control apparatus to issue device specific commands to a robot controller and a DI/DO device controller for individual control of the robot and DI/DO device.

In a preferred apparatus, the workcell operation control means including a workcell operation language processor, workcell control driver means including robot control driver means for realtime control of said robot, and DI/DO control driver means for realtime control of said DI/DO device the workcell operation language processor interpreting commands defined by workcell operation software to send commands to the robot control driver and the DI/DO control driver.

Thus, the present invention permits the realisation of cooperative realtime control of devices and information. Furthermore, there is provided a unifed program interface which contributes to a workcell control system that is compact and flexible and that can be implemented at low cost.

In addition, the control apparatus is designed to provide communication functions capable of effective communication with an upper manufacturing system.

The DI/DO control driver means of a preferred apparatus preferably includes means for registering in or erasing from a condition and action table a set of DI signal conditions and actions to be performed when the conditions are satisfied; means for converting a command described in a control program by the use of predetermined kinds of program interface into a signal processing task including a set of conditions and actions, and for registering or erasing the set of conditions and actions produced by the conversion; and means for periodically activating a signal processing task. The signal processing task reads a current value of the DI signal, evaluates the conditions registered in the condition and action table, and performs an action corresponding to a satisfied condition.

The above operation includes task activation and task erasure. Further, the predetermined kinds of program interfaces are:

a. waiting in a synchronized state until a signal is turned on;

b. waiting in a synchronized state until a signal is turned off;

c. waiting in a synchronized state until a signal is inverted;

d. binding a task to a signal so that the task is activated when the signal is turned on, and so that the task is automatically erased when the signal is turned off;

e. binding two signal so that the input value of a certain signal is automatically employed as the output value of a different signal; and f. binding two signals so that the inverted input value of a certain signal is automatically employed as the output value of a different signal.

It will be appreciated that while the DI/DO control technique described above finds effective use in a workcell control apparatus, the technique is useful in the general control of DI/DO devices.

The control device of an operation panel that has keys and a display screen, and that provides messages in response to key input by an operator, and outputs information to the display screen, comprises:

a control program;

a key binding definition file for describing keys and action outputs bound thereto;

a base screen file for defining a base screen;

a variable definition file for defining the name and the location of a variable whose value is to be displayed on the base screen;

a means for responding to registration messages of a key binding definition file described in the control program, for activating a new key-handle task with new key bindings after erasing a previously activated key-handle task if one exists; and a means for responding to registration messages of a base screen file and a variable definition file described in the control program, for outputting the base screen file to the display screen, and for outputting the variable value to the display screen in accordance with the variable definition file.

The above key-handle task produces, from the key binding definition file, an array of structures including keys and text describing action outputs bound to the keys, and, in response to key input, interprets the text of an action output bound to the key.

BRIEF DESCRIPTION OF THE DRAWING

A preferred embodiment of the invention will now be described, by way of example only, with reference to the accompanying drawings in which:

FIG. 2 shows a part of a conventional robot language program for controlling robot operation;

FIG. 3 shows part of a conventional ladder chart for controlling DI/DO device operation;

FIG. 4 is a block diagram showing the configuration of a workcell according to the invention;

FIG. 6 is a block diagram showing the software configuration of a workcell controller according to the invention;

FIG. 7 shows a program for synchronizing robot operation and device operation according to the invention;

FIG. 9 shows a program for operation of DI/DO devices according to the invention;

FIG. 10 shows a program for operation of DI/DO devices according to the conventional technique;

FIG. 13 shows an example of a base screen file;

FIG. 14 shows an example of another base screen file;

FIG. 15 shows an example of a variable definition file; and

DETAILED DESCRIPTION OF THE INVENTION

Figure 1:
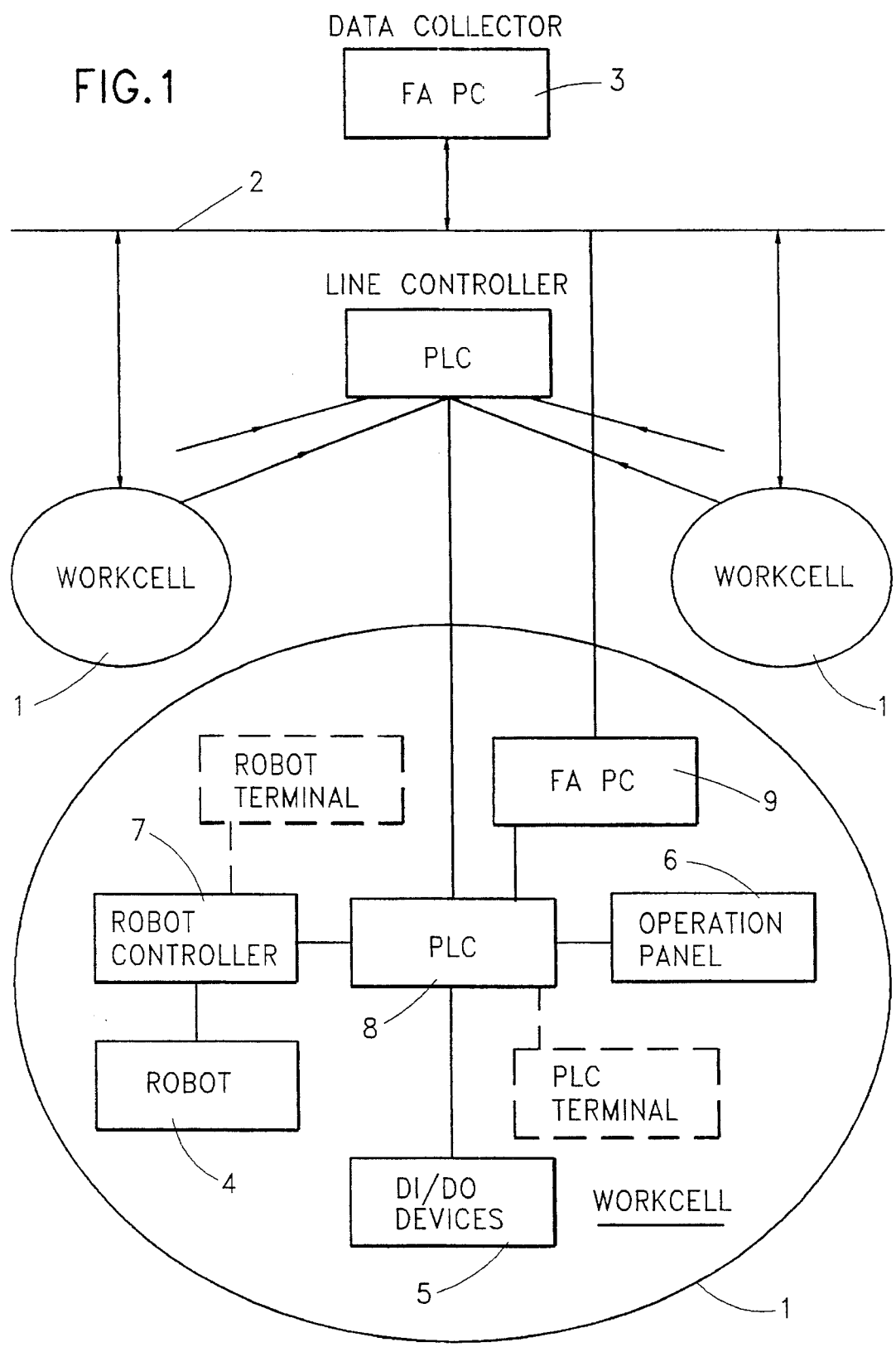
FIG. 1 is a block diagram showing the conventional configuration of a workcell.

FIG. 4 schematically shows a factory automation system and workcells included therein embodying the present invention, The constituent elements of a workcell, namely, a workcell controller, DI/DO signal processing, and an operation panel server, are described below.

I. Workcell controller

A workcell 11 includes the following standard manufacturing devices:

Industrial robot 12

DI/DO devices 13

An on/off sensor such as a proximity sensor outputs a DI signal, and an on/off control actuator such as an air valve operates in response to a DO signal.

Operation panel 14

This is a combination of a display device such as a liquid crystal display and an input device such as a handy terminal.

Communication device 15 such as a LAN

This device serves to receive production commands from an upper floor controller 18, and to exchange information on operation statuses with other workcells 11.

Workcell terminal 16

This device, which can be a notebook PC, serves to develop workcell operation software, and to perform debugging, maintenance, and information acquisition.

Devices 12–16 are physically connected to a single workcell controller 17. The workcell controller 17 is a device into which the conventional robot controller, PLC, and FA PC are physically and functionally integrated, and which performs device control and information handling in the workcell 11 according to operation software that is written in a unified manner.

Figure 5:
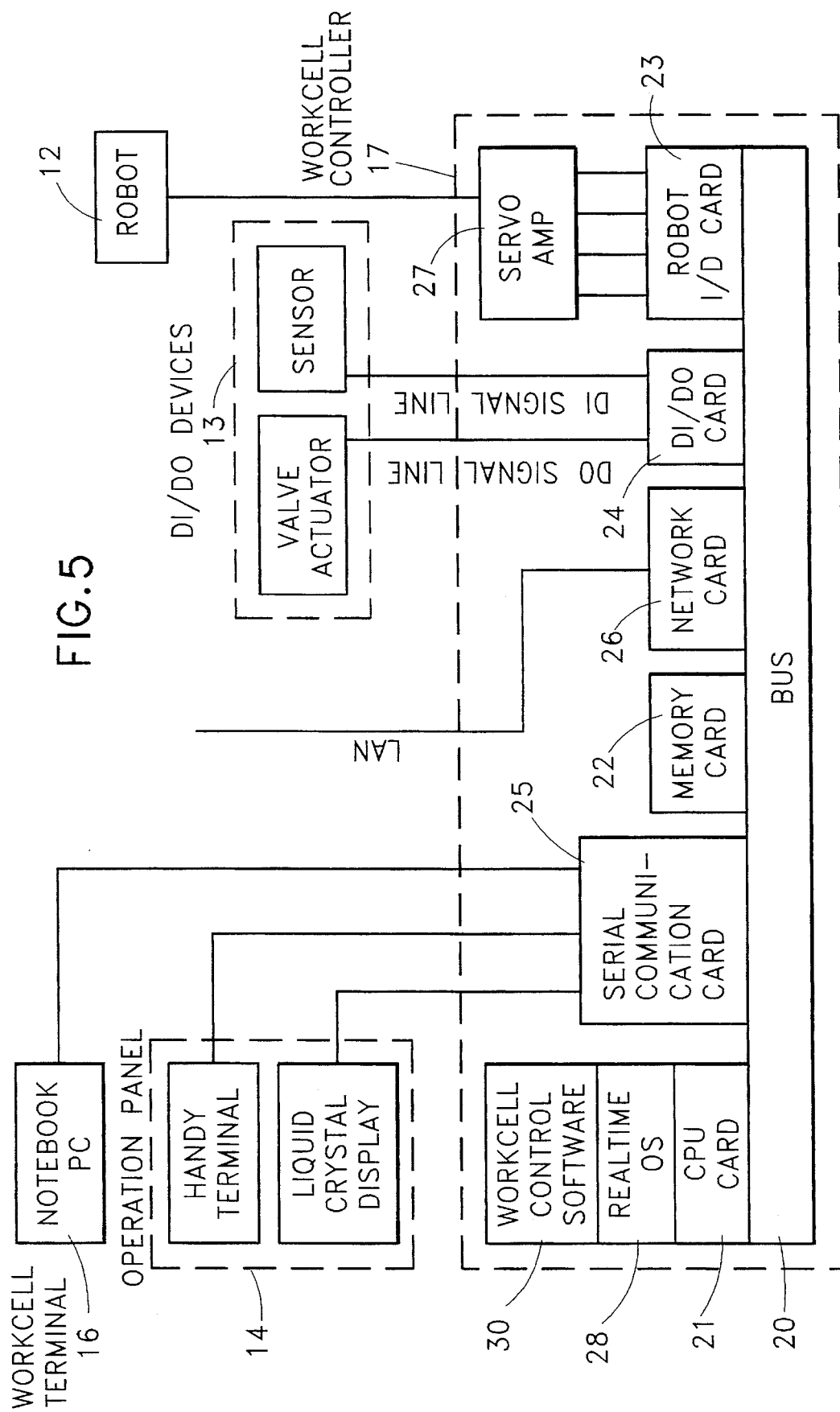
FIG. 5 is a block diagram showing the hardware configuration of a workcell controller according to the invention.

FIG. 5 shows the hardware configuration of the controller 17. As shown, the controller 17 has the following cards on a common bus 20:

CPU card 21

This card serves to execute workcell control software 30 that runs on a realtime OS 28 and the card itself.

Memory card 22

This card stores programs and data.

Robot I/O card 23

This card is connected to servo amplifiers 27 for the driving motors that are provided at the joints of an industrial robot 12. This card has a pulse counter (not shown) as an input interface device, and receives pulses generated by an encoder (not shown) at the robot joints. This card has a D/A converter (not shown) as an output interface device, and outputs analog signals to send commands specifying the speed to the servo amplifiers 27. Alternatively, this card has a pulse generator, and outputs pulses to directly instruct the robot 12 about displacement. This card may be equipped with a digital signal I/O interface device for control signals and monitor signals of the servo amplifiers 27 and output signals from limit sensors and origin sensors of the robot 12.

DI/DO card 24

This card has a digital signal I/O interface device, and is connected to the DI/DO devices 13. The I/O interfaces connected to this card have their own I/O numbers. Many of the devices included in the workcell 11 are connected to this card, and are controlled by software (the DI/DO control driver described later) according to unique I/O numbers assigned thereto.

Serial communication card 25

This card has a serial communication interface device, for instance, an RS-232C, and is connected to the display device and input device of the operation panel 14 and the workcell terminal 16. In some cases, the functions of this card are incorporated into the CPU card 21.

Network card 26

This card has a LAN interface device of the Ethernet or token-ring type, and is connected to a LAN provided in the FA system. In some cases, the functions of this card are incorporated in the CPU card 21. As shown in FIG. 6, the workcell control software 30 that runs on the realtime OS 28 consists of the following three layers:

Workcell operation software 31

This software describes operations specific to the workcell 11. The industrial robot 12, DI/DO devices 13, information, communication, and so on in the workcell 11 are controlled in accordance with the descriptions in this software. This software is unique to each workcell 11 in that it describes the operations specific to the workcell 11. Only this software needs to be newly prepared when a workcell 11 is installed.

Workcell operation language processor 32

This software interprets and processes the workcell operation software 31. When a function related to workcell control is called by the operation software 31, this software provides a command to a workcell control driver 33.

Workcell control driver 33

In accordance with the commands from the workcell operation language processor 32, this software performs realtime control of the robot 12 and the DI/DO devices 13 and processing of information and communications.

The workcell control driver 33 comprises the following:

Robot control driver 34

On the basis of the operation commands described in the operation software 31, this generates a locus for the robot 12, calculates servo targets, and servo-controls the motors provided at the joints of the robot 12 so that the robot 12 follows the calculated servo targets. The input/output with the hardware is performed through the robot I/O card 23.

DI/DO control driver 35

This controls the DI/DO devices 13 through the DI/DO card 24. Several levels of interfaces may be conceived, ranging from a lower interface that simply reads a DI signal and outputs a DO signal to an upper interface that outputs a signal under a specified signal condition. Details are given in II. "DI/DO signal processing."

Operator interface 36

This outputs text or graphic information to the display device of the operation panel 14, and receives an operator's instructions through the input device of the operation panel 14. Details are given in III. "Operation panel server."

Workcell terminal interface 37

This serves as an interface with the workcell terminal 16 that is used for the development, debugging, and maintenance of the operation software 31 at a work site.

Workcell monitor logger 38

This serves to log the robot operation commands and DI/DO signal processing for the debugging and maintenance of the workcell operation software 31.

File system interface 39

This serves as an interface with a file system for information storage.

Database interface 40

This is an interface for reference to, addition to, updating of, or deletion of database information. Depending on the location of the database, the file system interface 39 or network interface 41 is used instead of the database interface 40.

Network interface 41

This serves as an interface with the LAN based on a predetermined protocol.

FIG. 7 shows an example of the workcell operation software 31, which is a program for synchronizing the robot operation and the operations of the DI/DO devices 13 and corresponds to a combination of the program in FIG. 2 and the ladder chart in FIG. 3. According to the invention, control commands to the robot 12 and to the DI/DO devices 13 are written in a unified language and mixed together in a single program. The workcell operation language processor 32 interprets this program, provides commands to the robot 12 (RobotMove(P1), RobotWait(P1), RobotMove(P2), RobotWait(P2)) contained therein to the robot control driver 34, and provides commands to the DI/DO devices 13 (DOon(Y1), DIwaitOn(X1), DOon(Y2), and DIwaitOn(X2)) to the DI/DO control driver 35. The kinds of statement in the workcell operation software 31 that describe the control of the robot 12, DI/DO devices 13, and so on are predetermined to avoid duplication, so that the workcell operation language processor 32 can send commands to the correct drivers.

II. DI/DO signal processing

Next, a description is given of the DI/DO signal processing using a high-level language according to the invention. It is assumed that in the embodiment the following three kinds of signals are used in the workcell 11: DI signals provided from sensors etc., DO signals to be sent to actuators, valves, relays, and so on, and program definition signals that are used only in the control program.

The following program interfaces, written in a high-level language, are provided in conventional DI/DO signal processing:

Signal state detection

Signal on output

Signal off output

Signal inversion output

Signal positive pulse output

Signal negative pulse output

However, these signals simply recognize a DI signal state or output a DO signal. A user needs to write a program to describe the details of action outputs in accordance with condition judgment and condition satisfaction. To solve this problem, in the invention, the following two kinds of signal processing are provided to allow the DI/DO signal processing to be program-controlled, using a high-level language.

1. High-speed signal processing by registration in a condition and action table, to perform signal condition judgment and signal action output 2. General-purpose signal processing performed procedurally by using language control structures of a high-level language, for processes not requiring high-speed processing The above two kinds of signal processing are described below separately.

High-Speed Signal Processing

The following sets of conditions and actions are registered in the condition and action table for the high-speed signal processing:

Conditions

Signal on

Signal off

Signal rise

Signal fall

Signal inversion

Function evaluation value

In this description, the "function evaluation value" means an evaluation value of a formula as a combination of signal states, as exemplified below.

DI signal #10 is on and DI signal #20 is off.

Actions

Signal on output

Signal off output

Signal inversion output

Signal positive pulse output

Signal negative pulse output

Task activation

Task erasure

Using the above conditions and actions, the high-speed signal processing is described by using a high-level language in the following manner, for instance, and is registered in the condition and action table.

(EXAMPLE 1)

| Registration | Condition: | DI signal | #21 | Rise |
|---|---|---|---|---|
| | Action: | DO signal | #34 | Off output |

(EXAMPLE 2)

| Registration | Condition: | DI signal | #25 | Inversion |
|---|---|---|---|---|
| | Action: | Task Pallet stopper elevation Activation | | |

Figure 8:
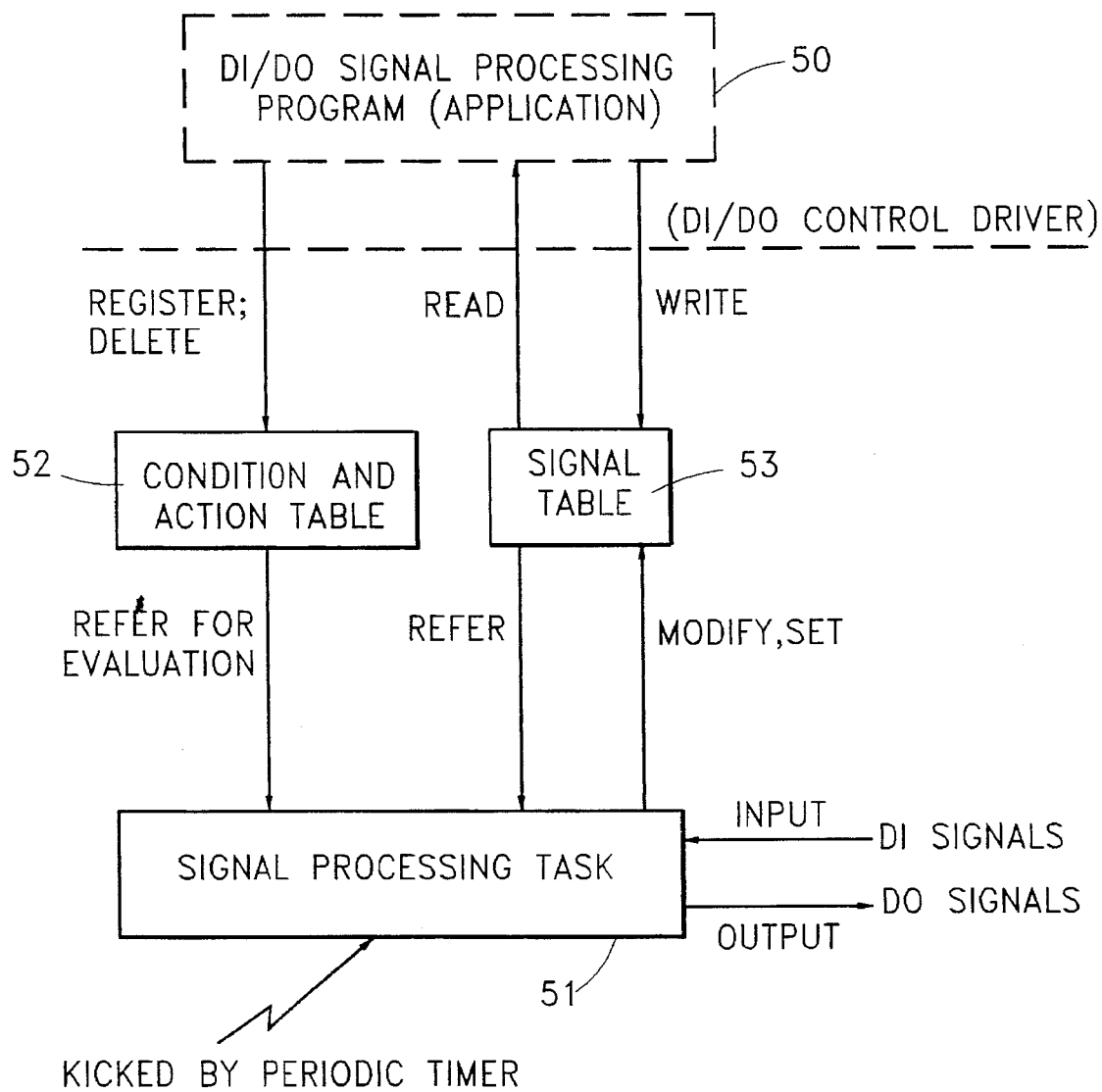
FIG. 8 illustrates DI/DO signal processing according to the invention.

A method using a periodically activated task is described below, with reference to FIG. 8, as one technique for implementing high-speed signal processing.

In this embodiment, a DI/DO signal processing program 50 corresponds to the workcell operation software 31 and the workcell operation language processor 32 in FIG. 6. The processing below the DI/DO signal processing program 50 is performed by the DI/DO control driver 35.

The workcell operation language processor 32 interprets the workcell operation software 31, responds to registration commands in the form of a set of conditions and actions like examples 1 and 2 described above, and provides those commands to the DI/DO control driver 35. In response, the DI/DO control driver 35 registers the set of conditions and actions in a condition and action table 52.

While evaluating the registered conditions at high speed, the DI/DO control driver 35 keeps a periodically activated high-speed signal processing task 51 in an operating state, to allow execution of the action when the conditions are satisfied. In task 51, in addition to the condition and action table 52, a signal table 53 consisting of the following elements is accessed:

Signal values to be used in condition evaluation

Current signal value

Inversion of current signal value

Preceding signal value

Flag indicating a signal change

Flag indicating a change from signal off to on

Flag indicating a change from signal on to off

Signal values to be used in action output

Signal on output flag

Signal off output flag

Signal inversion output flag

Signal positive pulse output flag

Signal negative pulse output flag

Task 51 involves the following operations:

1. Reading the DI signal value, and setting the value in the signal table 53 as the "current signal value."

2. Calculating the remaining signal values of the "signal values to be used in condition evaluation" from the "current signal value" and the "preceding signal value."

3. Sequentially examining the condition and action table 52. Establishing a flag in the "signal values to be used in action output" when the action corresponding to a satisfied condition is signal output, and when it is task activation/erasure, finishing its operation at this stage.

4. Determining the current signal output in accordance with the priority order of actions, and effecting the signal output. The priority order of actions is predetermined, for instance, in the following manner:

(Signal on output)>(Signal off output)>(Signal inversion output)>(Signal positive pulse output)>(Signal negative pulse output)

5. Setting the determined signal as the "preceding signal value."

General-Purpose Signal Processing

The following program interfaces (built-in functions) are prepared to facilitate, by means of a high-level language, procedural signal processing for general-purpose signal processing that requires only a moderate processing speed.

a. Waiting in a synchronized state until the signal is turned on.

b. Waiting in a synchronized state until the signal is turned off.

c. Waiting in a synchronized state until the signal is inverted.

d. Binding a certain task to the signal so that the task is activated when the signal is turned on, and so that the task is automatically erased when the signal is turned off.

e. Binding two signals so that the input value of a certain signal is automatically employed as the output value of a different signal.

f. Binding two signals so that the inverted input value of a certain signal is automatically employed as the output value of a different signal.

These program interfaces are implemented by using the above high-speed signal processing. To this end, the following action is added as an action that can be registered in the condition and action table 52.

Action: semaphore V operation

Using this action, the program interfaces a, b, and c are implemented by the DI/DO control driver 35 in the following manner:

1. Generating a semaphore in a state in which a P operation has been performed.

2. Registering the following sets of conditions and actions in the condition and action table 52:

| For the program interface a, | |
|---|---|
| Condition: | Signal on |
| Action: | Semaphore V operation |
| For the program interface b, | |
| Condition: | Signal off |
| Action: | Semaphore V operation |
| For the program interface c, | |
| Condition: | Signal inversion |
| Action: | Semaphore V operation |

3. Waiting in a synchronized state until a semaphore is obtained by a semaphore P operation.

4. Erasing the set of conditions and actions and the semaphore.

The program interfaces d, e, and f are equivalent to the following signal processing operations, respectively:

| In the case of the program interface d, | |
|---|---|
| Registration | Condition: Signal on |
| Action: | Task activation; and |
| Registration | Condition: Signal off |
| Action: | Task erasure |
| In the case of the program interface e, | |
| Registration | Condition: Signal on |
| Action: | Signal on output; and |
| Registration | Condition: Signal off |
| Action: | Signal off output |
| In the case of the program interface f, | |
| Registration | Condition: Signal on |
| Action: | Signal off output; and |
| Registration | Condition: Signal off |
| Action: | Signal on output |

Therefore, with respect to the program interfaces d, e, and f, the DI/DO control driver 35 performs the high-speed signal processing by registering the two equivalent sets of conditions and actions in the condition and action table 52.

FIG. 9 shows an example of a control program for the DI/DO devices 13 according to the invention. For comparison, FIG. 10 shows a conventional program written in a high-level language that corresponds to the program of FIG. 9. According to the invention, by virtue of the use of the program interfaces a (DIwaitOn) and b (DIwaitOff), programs can be written in a simplified manner.

Further, whereas conventionally the task PartsRotation needs to be kept operating all the time, in the invention it is sufficient that the task PartsRotation be activated only when a predetermined condition is established.

III. Operation panel server

The operation panel is indispensable for the debugging at the time of software installation, for the maintenance, and for the monitoring in the workcell. However, conventionally, in many cases the operation panel specific to the workcell is implemented by hardware. Even if it is programmable, the program needs to be greatly altered for each workcell.

To solve this problem, the invention provides a software tool that is effective for designing an operation panel and preparing a program therefor. To this end, since the methods of the command output and the information output of the operation panel should be available for general purposes, the invention discloses a device that automatically performs input processing and display output once proper registration has been effected.

In the embodiment, a handy terminal having a small screen and several key pads is employed as the input device. A liquid crystal display is employed as the output device. The input device and the output device are connected to the workcell controller 17 of the workcell 11 via, for instance, RS-232C devices (see FIG. 5).

Figures 11, 12:
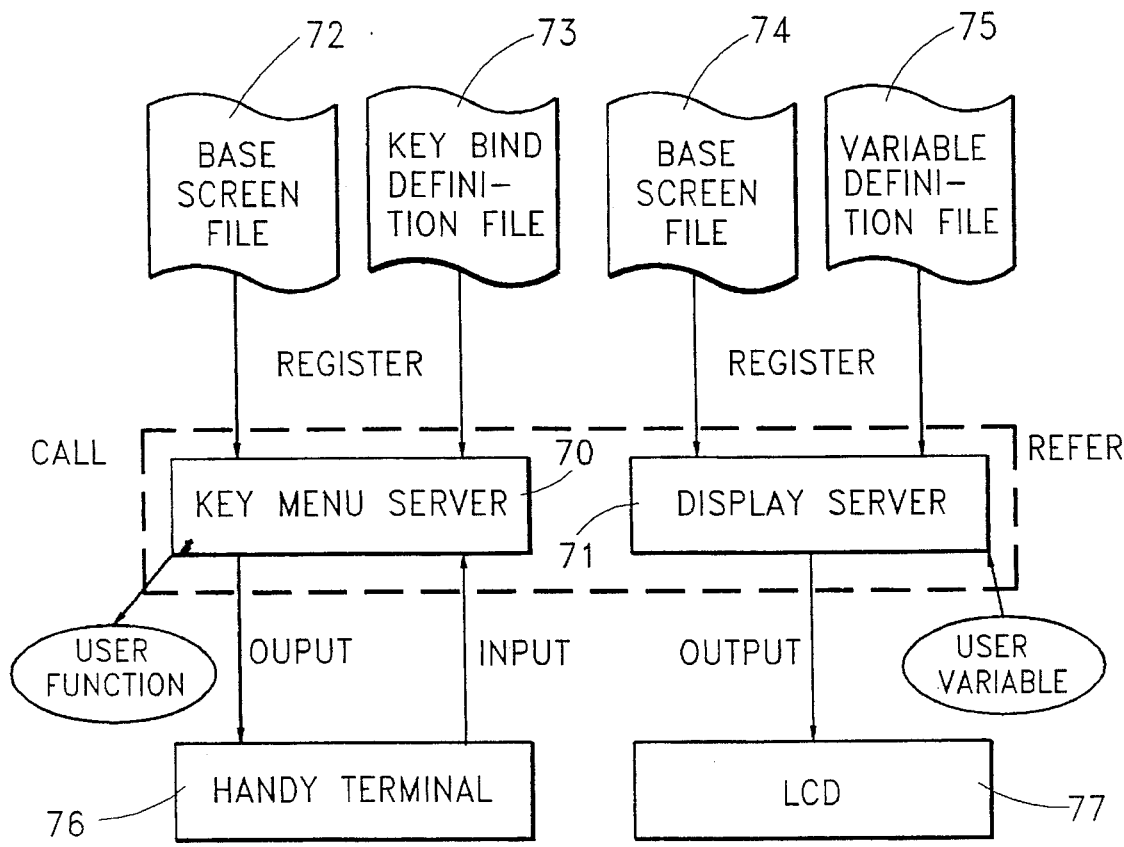
FIG. 11 is a block diagram outlining an operation panel server according to the invention.
FIG. 12 shows an example of a key binding definition file.

First, the entire framework is shown in FIG. 11. The invention relates to the system software of the workcell controller 17. In FIG. 6, the system software is indicated as the operator interface 36, and consists of a key menu server 70 and a display server 71. In this description, the "operation panel server" is a general term for the two servers 70 and 71.

An operation of converting a key input of an input device 76 into an action output is automatically performed by registering a key bind definition file 73 and a base screen file 72 in the key menu server 70. Output of information to an output device 77 is automatically performed if a base screen file 74 and a variable definition file 75 are registered in the display server 71.

Message Input Device Server

The key menu server 70 accesses the key bind definition file 73 and the base screen file 72. The key binding definition file 73 describes sets of input keys and software functions. FIG. 12 shows an example of the content of the key binding definition file 73. The content of the base screen file 72 is a text to be displayed on a small screen of the handy terminal 76. FIG. 13 shows an example of the content of the base screen file 72. Files 72 and 73 may be incorporated into the system, or they may be produced by a user by means of a text editor, for example.

In order to bind an input key with an action output corresponding to the pressed key, a user describes, in the workcell operation software 31, a registration message specifying the name of the key bind definition file 73 and the name of the base screen file 72. The workcell operation language processor 32 sends a registration message including the names of the key bind definition file 73 and the base screen file 72 to the operation panel server.

By performing the following operations, the key menu server 70 produces an execution output in response to depression of a key of the input device 76, and further alters the registration:

1. Waiting for the arrival of a registration message. Upon its arrival, reading a file name included in the message.

2. If a key-handle task has been previously activated, sending a signal to the task to terminate itself.

3. Waiting in a synchronized state until the previous key-handle task is erased.

4. Activating a new key-handle task with the registered key binds.

5. Returning to step 1.

The key-handle task performs the following operations:

1. Outputting the base screen file 72 to the small screen.

2. From the key bind definition table 73, making an array of structures consisting of the name of a key, and a text describing an action output to be produced when that key is pressed.

3. Waiting for a predetermined period for key input.

4. When key input occurs, interpreting the text of the action output bound to the key. If necessary, finding the absolute address of the function from its name, and calling that function.

5. If a signal for task termination has arrived, erasing itself.

6. Returning to step 3.

Display Server

The display server 71 accesses the base screen file 74 and the variable definition file 75. As shown in FIG. 14, the base screen file 74 defines the background of an output screen. In this embodiment, the base screen file 74 is adapted to enable, for a display device permitting specification of attributes such as inverted display and underline display in addition to display of a simple text, line-by-line specification of character output lines and output attributes of those characters. As shown in FIG. 15, the variable definition file 75 defines variable names such that they are bound to their types, output locations, attributes, and formats. Files 74 and 75 may be incorporated in the system, or they may be produced by a user by means of a text editor, for example.

A user describes, in the workcell operation software 31, a registration message specifying the name of the base screen file 74 and the name of the variable definition file 75. The workcell operation language processor 32 sends a registration message including the names of the base screen file 74 and the variable definition file 75 to the operation panel server.

Figure 16:
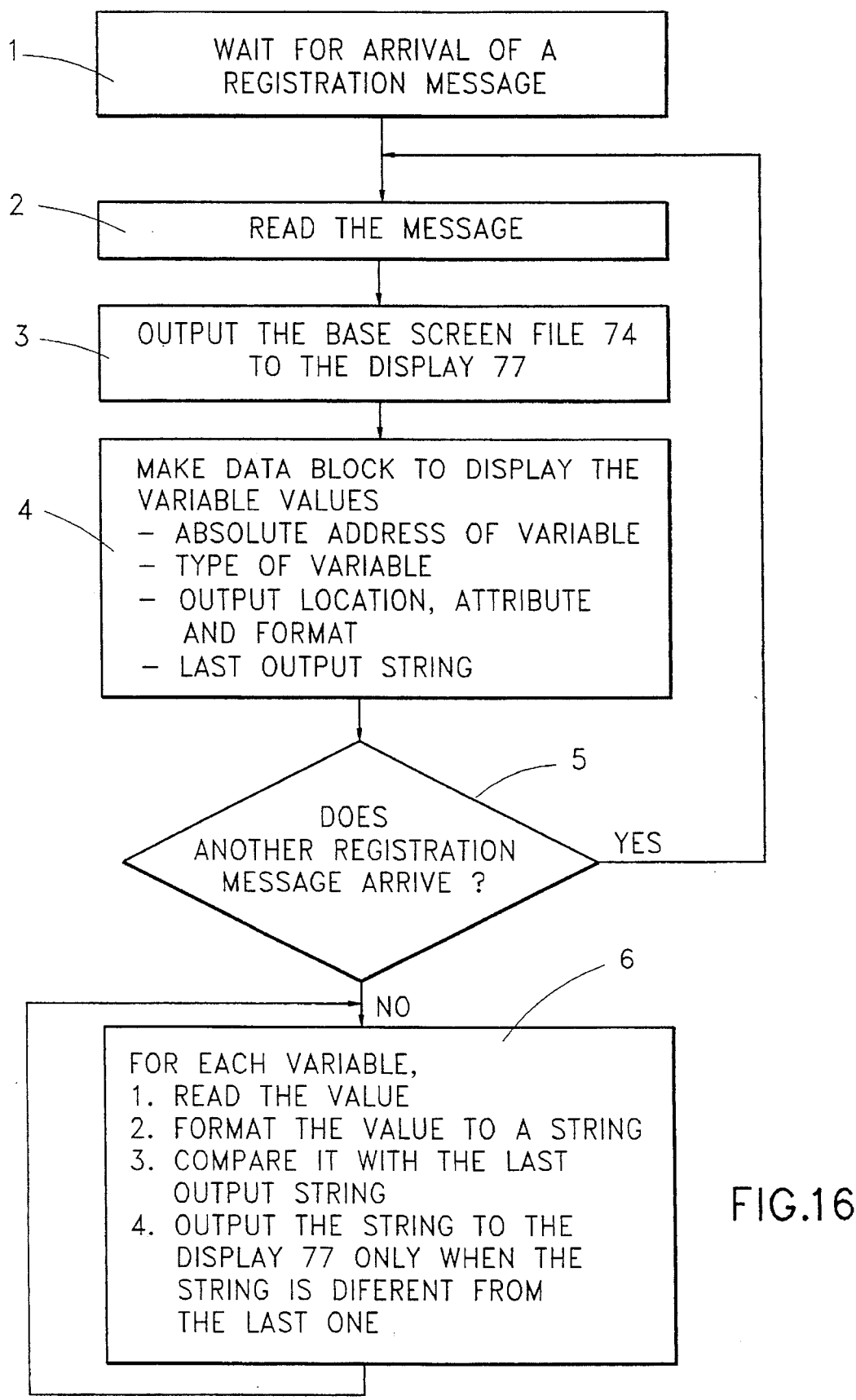
FIG. 16 is a flowchart showing a process of a display server.

As shown in FIG. 16, the display server 71 automatically updates the variable values and outputs them for display and, further, alters the registration by iterating the following steps 1–4.

1. Waiting for the arrival of a registration message.

2. Upon arrival of a message, reading a file name included in it.

3. Outputting the base screen file 74 to the display 77.

4. Reading, from the variable definition file 75, a variable name, its type, output location, attribute, format, and so on, and finding the absolute address for the variable according to its name. On the basis of the above information, making an array of structures consisting of:

the absolute address of a variable the type of the variable the output location, attribute, and format the last output string (NULL in the initial state).

5. If another registration message arrives, returning to step 1.

6. For each variable, reading its value, formatting the value into a string, comparing it with the last output string, and outputting the string to the display 77 so that the string is displayed at the predetermined location of the screen with the predetermined attribute only when the string is different from the last one. Also, changing the "string previously displayed" of the structure for the variable. Step 6 is cyclically executed.

Although the invention is described above by way of a specific embodiment, the scope of the invention is not limited thereto. Devices such as a touch panel, in which the input and output devices are united, can be regarded as hand-held terminals not having a small screen. Therefore, the invention can be realized in a similar manner with such a device by using the key binding definition file 73, base screen file 74, variable definition file 75, key menu server 70, and display server 71. In this case, the registration message described in the workcell operation software 31 does not include the name of the base screen file 72.

We claim:

1. Integrated control apparatus for controlling the operation of a robot and a digital input/output (DI/DO) device in a workcell of an automated production system, the control apparatus comprising:

a workcell processor;

workcell operation software specific to said workcell and running on said workcell processor for generating control commands;

workcell operation language processor software running on said workcell processor for interpreting said control commands and generating device specific robot commands and device specific DI/DO commands:

a robot control driver responsive to said robot commands for realtime control of said robot: and a DI/DO device control driver responsive said DI/DO commands for realtime control of said DI/DO device.

2. Control apparatus as claimed in claim 1, said workcell operation software being in a single programming language.

3. Control apparatus as claimed in claim 1, said workcell operation software defining all device control operations and information handling operations which are specific to said workcell.

4. Control apparatus as claimed in claim 1, further including communication means for allowing connection, for information exchange, to other workcells and an upper control apparatus via a network, said control apparatus comprising a network interface for interfacing with the network according to a predetermined protocol.

5. Control apparatus as claimed in claim 1, and further comprising:

a common bus, a CPU card on said common bus, a memory card on said common bus, a robot card on said common bus for interfacing with said robot on a signal level, and a DI/DO card on said common bus for interfacing with said DI/DO device on a signal level.

6. Control apparatus as claimed in claim 1, further comprising workcell terminal communication means for connecting to a workcell terminal for use in development, debugging, and maintenance of said workcell operation software, the terminal communication means comprising a workcell terminal interface component for interfacing with said workcell terminal, a workcell monitor logger for logging operation commands of said robot, and DI/DO signal processing means for debugging and maintaining said workcell operation software.

7. Control apparatus as claimed in claim 1, wherein the DI/DO device control driver comprises:

a condition and action table;

means for receiving commands from an upper control means, for registering in or erasing from said condition and action table a set of digital input signal conditions and actions to be performed when said conditions are satisfied; and means for periodically activating a signal processing task which operates to read a current value of a digital input signal, evaluate said conditions registered in said condition and action table, and perform an action corresponding to a satisfied condition.

8. A control apparatus as claimed in claim 7, in which said actions include task activation and task erasure.

9. A workcell for use in an automated production system, comprising:

a robot, a digital input/output (DI/DO} device for inputting and outputting DI/DO signals, an operation panel for interfacing with an operator, and a single control apparatus, said single control apparatus comprising:

a workcell processor:

workcell operation software specific to said each workcell and running on said workcell processor for generating control commands:

workcell operation language processor software running on said workcell processor for interpreting said control commands and generating device specific robot commands and device specific DI/DO commands:

a robot control driver responsive to said robot commands for realtime control of said robot: and a DI/DO device control driver responsive to said DI/DO commands for realtime control of said DI/DO device.

10. An automated production system comprising a plurality of interconnected workcells and an upper control apparatus for controlling the entire system, each said workcell comprising a robot, a digital input/output (DI/DO) device for inputting and outputting DI/DO signals, an operation panel for interfacing with an operator, and a single control apparatus, each said single control apparatus comprising;

a workcell processor:

workcell operation software specific to said each workcell and running on said workcell processor for generating control commands;

workcell operation language processor software running on said workcell processor for interpreting said control commands and generating device specific robot commands and device specific DI/DO commands;

a robot control driver responsive to said robot commands for realtime control of said robot; and a DI/DO device control driver responsive to said DI/DO commands for realtime control of said DI/DO device.

11. An automated production system as claimed in claim 10 and further comprising operation panel interconnection means for connecting to said operation panel for providing an interface with said operator of said each workcell, the operation panel interconnection means comprising a portion of said workcell operation software for defining control messages for said operation panel and an operator interface component for outputting text or figure information to a display device of said operation panel and for receiving operator instructions through an input device of said operation panel.

12. An automated production system as claimed in claim 11, wherein said operation panel interconnection means controls a corresponding relationship between keys and action outputs of said operation panel to provide messages in response to key input by said operator:

said operation panel interconnection means operating to access a key binding definition table that describes keys and action outputs bound thereto;

said operation panel interconnection means comprising a means for responding to messages including the name of a key binding definition file sent from said upper control apparatus, and for activating a new key-handle task with new key bindings after erasing a previously activated key-handle task if one exists;

and in which said key-handle task produces, from said key binding definition file having said name, an array of structures including keys and text describing action outputs bound to said keys, and, in response to key input, interprets text of an action output bound to said key.

13. An automated production system as claimed in claim 12 wherein the operation panel is provided with a display screen;

said operation panel interconnection means is further capable of accessing a base screen file that defines a base screen;

said message from said upper control means further includes a name of a base screen file; and said key-handle task further outputs said base screen file having said name included in said message to said display screen.

* * * * *